(12) United States Patent
Egawa et al.

(10) Patent No.: US 7,173,954 B2
(45) Date of Patent: Feb. 6, 2007

(54) GAS LASER OSCILLATION DEVICE

(75) Inventors: Akira Egawa, Gotenba (JP); Michinori Maeda, Gotenba (JP)

(73) Assignee: Fanuc Ltd, Yamanashi (JP)

( * ) Notice: Subject to any disclaimer, the term of this patent is extended or adjusted under 35 U.S.C. 154(b) by 69 days.

(21) Appl. No.: 10/730,264

(22) Filed: Dec. 9, 2003

(65) Prior Publication Data
US 2004/0125847 A1    Jul. 1, 2004

(30) Foreign Application Priority Data
Dec. 10, 2002    (JP)    ............... 2002-358027

(51) Int. Cl.
*H01S 3/22*    (2006.01)
*H01S 3/00*    (2006.01)

(52) U.S. Cl. ..................... 372/55; 372/38.04
(58) Field of Classification Search ........... 372/55, 372/38.04
See application file for complete search history.

(56) References Cited

U.S. PATENT DOCUMENTS

| | | | |
|---|---|---|---|
| 4,622,675 A | 11/1986 | Penn | 372/58 |
| 4,677,637 A | 6/1987 | Karning et al. | 372/83 |
| 4,757,511 A | 7/1988 | Klingel et al. | 372/58 |
| 5,422,906 A | 6/1995 | Karasaki et al. | 372/61 |
| 5,426,659 A | 6/1995 | Sugiyama et al. | 372/58 |
| 5,450,435 A | 9/1995 | Yamane et al. | 372/58 |

FOREIGN PATENT DOCUMENTS

| | | |
|---|---|---|
| EP | 0492340 | 12/1991 |
| EP | 1 184 946 A1 | 3/2002 |
| JP | 61-280689 | * 12/1986 |
| JP | 64-042187 | 2/1989 |
| JP | 1-345038 | 12/1989 |
| JP | 2-281669 | 11/1990 |
| JP | 02-281670 | * 11/1990 |
| JP | 02281670 | * 11/1990 |
| JP | 2002-118312 | 4/2002 |

OTHER PUBLICATIONS

Notice of Reasons For Rejection dated Jun. 14, 2005.
Notice of Reasons for Rejection dated Sep. 6, 2005.

* cited by examiner

*Primary Examiner*—Armando Rodriguez
(74) *Attorney, Agent, or Firm*—Staas & Halsey LLP

(57) ABSTRACT

A plurality of discharge sections are formed in an optical resonance space and are provided with electrodes that are mutually different in for example shape, size and construction. Laser medium gas flows through a circulatory passage passing through a fan and heat exchangers. Mutually different modes can be obtained when discharge is produced independently in the discharge sections. When discharge is produced in both of the discharge sections, the various intermediate modes can be obtained, in accordance with the distribution of power supplied from power sources for discharge excitation that are independently operated. If the number of discharge sections is three or more, it is possible to control the distribution of the discharge power that is supplied to the discharge sections in regard to at least two discharge sections of these discharge sections, and the shape and dimensions of the discharge sections or shape, dimensions and construction of the electrodes are selected such that "different modes are excited when independently discharged".

1 Claim, 6 Drawing Sheets

US 7,173,954 B2

GAS LASER OSCILLATION DEVICE

BACKGROUND OF THE INVENTION

1. Field of the Invention

The present invention relates to a laser oscillation device of the discharge excitation type employing a gas as the laser medium, that is used in for example laser processing, medical treatment, illumination or communication and in particular relates to a gas laser oscillation device having a function of controlling the transverse mode of the laser output (hereinbelow referred to as "beam mode" or simply as "mode").

2. Description of the Related Art

Gas laser oscillation devices are widely employed in for example laser processing, medical treatment, illumination or communication and gas laser oscillation devices are known having a plurality of discharge sections, respective power sources for discharge excitation being connected to electrodes provided in each discharge section. FIG. 8 is a view showing the layout of major parts of a typical example thereof. In this Figure, reference symbols 4a and 4b represent respectively a rear mirror that does not have partial transparency, and an output mirror that has partial transparency. An optical resonance space is formed between these two mirrors 4a and 4b. In this optical resonance space, there are provided two discharge sections 3a and 3b.

The discharge sections 3a and 3b respectively comprise electrodes 22a and 22b. The electrode 22a is connected with a power source 1a for discharge excitation and the electrode 22b is connected with a power source 1b for discharge excitation. The discharge sections 3a and 3b are of the same size and the same shape and, likewise, for the electrodes 22a and 22b, electrodes of the same size and same shape and same electrode construction are employed.

The power sources 1a, 1b for discharge excitation are of the commonly known type that can be respectively independently operated and wherein the power that is supplied to the discharge sections 3a, 3b can be freely adjusted.

The laser medium gas is circulated through a circulatory path passing through the optical resonator using a fan 6. The medium gas that is fed from the fan is supplied to the discharge sections 3a, 3b after passing through a heat exchanger 5a to remove the heat of compression. The laser medium gas is excited by discharge in the discharge sections 3a, 3b to generate laser light. The laser light that is thus generated is amplified within the optical resonator by well-known principles and the output laser beam is extracted from the output mirror 4b. After emitting the laser light, the gas medium, which has reached a high temperature due to the discharge, is cooled in a heat exchanger 5b and again returned to the fan 6. In this example, the two discharge sections 3a and 3b are constituted by two discharge tubes and are driven by the two power sources 1a, 1b for discharge excitation, which are operated independently. The power sources 1a, 1b for discharge excitation are AC power sources, so the discharge that is created in the discharge sections 3a, 3b is an AC discharge.

Typically, in a gas laser oscillation device of this type, a beam mode is formed that is determined by the construction and dimensions of the optical resonator. That is, various different beam modes can be formed, depending on the length of the optical resonator (length of the optical path between the mirrors 4a and 4b) and the cross-sectional shape and dimensions or the like of the discharge sections. Also, when the discharge section is constituted by a discharge tube, the beam mode that is formed is determined by its internal diameter, the shape of the electrode and, in addition, although not shown in the drawing, the internal diameter of the aperture that is arranged on the optical path. Disclosure concerning this is made in for example Japanese Patent Application Laid-open No. 64-42187.

In fact, what sort of beam mode should be produced when employing the laser oscillation device is determined by the object, such as processing, for which this device is to be employed. However, in order to be able to cope with a wide range of applications, it is desirable that this beam mode should be capable of being suitably controlled to exhibit characteristics matching the application.

Regarding the control of this beam mode, a method of changing the mode that is widely employed conventionally is to introduce into or remove from the optical path an aperture, as disclosed in European Patent Application Laid-open No. 0492340.

Specifically, mode changeover is effected between the TEM00 mode (gaussian mode) or low-order mode and TEM01* (ring mode) or higher-order modes when an aperture is arranged on the optical axis or when the aperture is removed from the optical axis. However, typically, methods of mechanically moving such an aperture involve problems relating to durability or response, high-speed control thereof is difficult and adjustment of the optical axis of the aperture is also difficult, and such methods are very costly.

A further example of disclosure of prior art is Japanese Patent Application Laid-open No. 2002-118312. This relates to improvements in a method of controlling beam mode. In the embodiment of this publication, an adaptive mirror (mirror whose curvature can be changed) is employed for mode control and a technique is illustrated of changing over the mode by setting two mechanically changeable mirror curvatures. However, even with this method in which mirror curvature is changed, problems relating to response, controllability, difficulty of optical axis adjustment and cost still arise. A detailed description of the function and construction of an adaptive mirror is to be found in Japanese Patent Number 3072519.

SUMMARY OF THE INVENTION

According to the present invention, a gas laser oscillation device comprising a plurality of discharge sections that are respectively provided with electrodes for discharge and a plurality of power sources for discharge excitation respectively connected with the electrodes of the plurality of sections includes at least two discharge sections comprising electrodes that excite mutually different modes when respective independent discharges are produced in the plurality of discharge sections.

Of the plurality of power sources for discharge excitation, the power sources for discharge excitation that supply discharge power to at least two discharge sections are constructed so as to be capable of adjustment of the distribution of the amount of discharge power supplied to these at least two discharge sections. For example, power sources for discharge excitation that operate mutually independently, of the same number as "these at least two discharge sections", may be employed. In this way, the transverse mode of the laser output may be controlled by changing the distribution of the discharge of power in respect of the respective discharge sections by controlling the discharge power supplied to the discharge sections.

As the combination of "electrodes that excite mutually different modes when respective independent discharges are produced" in the discharge sections, a combination of electrodes may be adopted wherein at least one of the dimensions, shape or construction of these electrodes is different.

According to the present invention, use of the device in a wide range of applications can be achieved by realizing in a simple manner beam modes that are optimum for various different types of application simply by adjusting the distribution of power supplied to the discharge sections by the power sources for discharge excitation. Also, if the device is applied to a laser processing device that performs for example processing of materials, control of the beam mode becomes possible by specifying any desired position or section or time in respect of the processing head, thereby making it possible to provide a laser oscillation device of high performance.

According to the present invention, high-speed operation can easily be achieved by electrical control without depending on control of mechanical conditions such as aperture movement or change of mirror curvature, so that a gas laser oscillation device can be provided having a laser beam mode control function that is excellent in respect of controllability, convenience of handling, ease of maintenance, and economy.

BRIEF DESCRIPTION OF THE DRAWINGS

Objects and features in addition to the objects and features of the present invention as described above will become clear from the following description of an embodiment thereof with reference to the appended drawings. In the drawings:

FIG. 2A is a cross-sectional view given in explanation of a discharge tube employed in a discharge section 2a and FIG. 2B is a view showing the mode that is excited when discharge is produced independently in the discharge section 2a;

DESCRIPTION OF THE PREFERRED EMBODIMENTS

Figure 1:
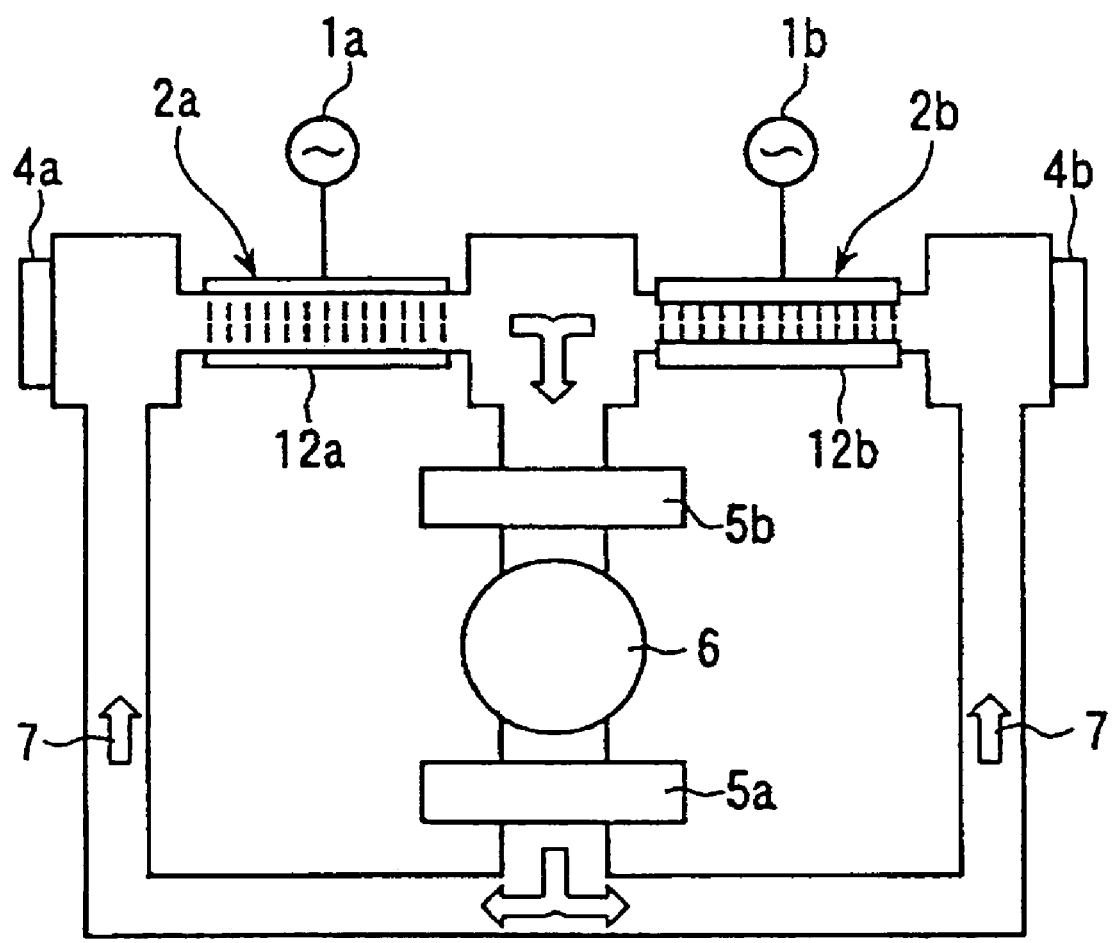
FIG. 1 is a view showing the layout of major parts of a laser oscillation device according to an embodiment of the present invention.
Figure 8:
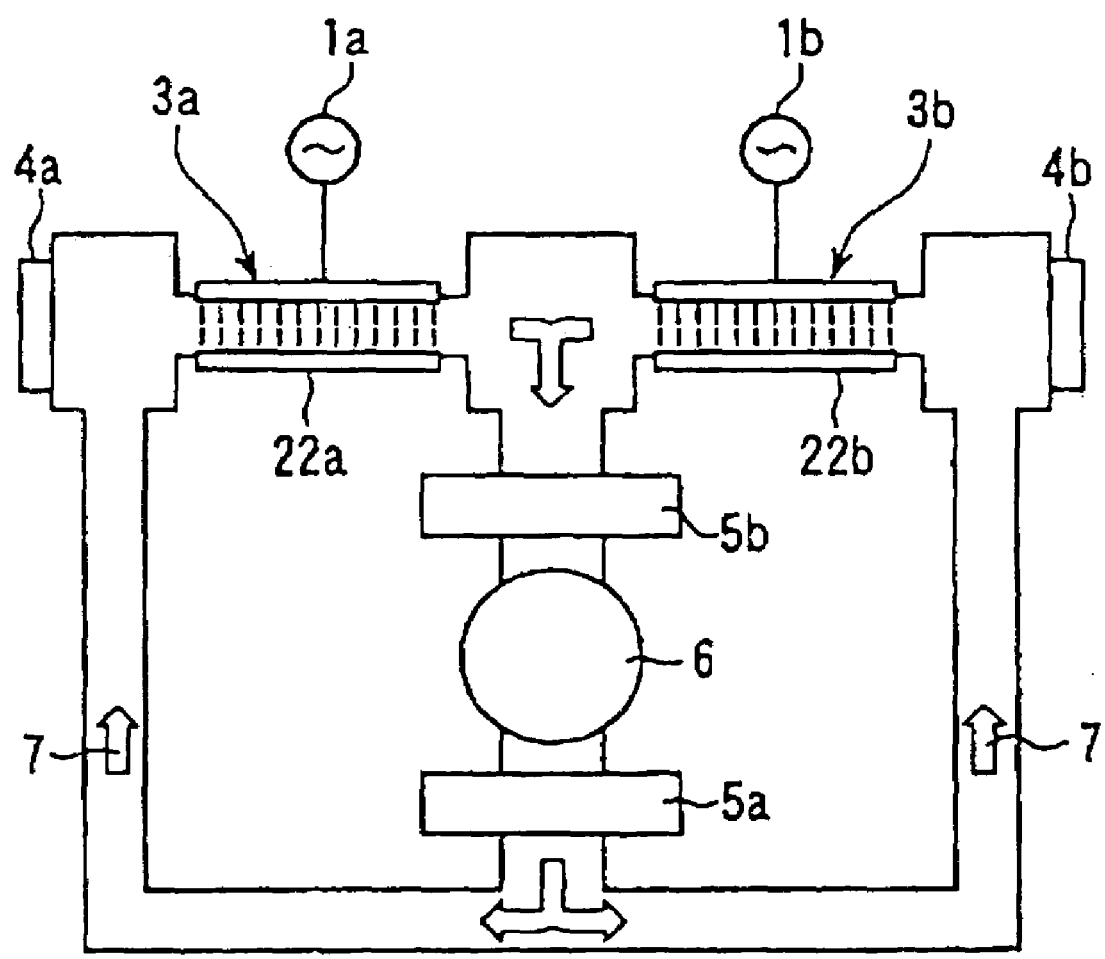
FIG. 8 is a view given in explanation of the layout of major parts in respect of a prior art example of a gas laser oscillation device having a plurality of discharge sections and wherein power sources for discharge excitation are respectively connected to electrodes provided in the discharge sections.

FIG. 1 is a view showing the layout of major parts of a laser oscillation device according to one embodiment of the present invention, shown with the same mode of representation as in FIG. 8. The same reference numerals are employed as appropriate for elements that are common with the layout shown in FIG. 8. Referring to this Figure, an optical resonance space is formed between the rear mirror 4a, which does not have partial transparency, and the output mirror 4b, which has partial transparency, and two discharge sections 2a, 2b are provided therebetween.

The discharge sections 2a, 2b are respectively provided with electrodes 12a, 12b. The electrode 12a is connected with a power source 1a for discharge excitation and the electrode 12b is connected with a power source 1b for discharge excitation. These power sources 1a, 1b for discharge excitation are respectively independently operated AC power sources and are arranged to be capable of being individually adjusted to set the power that is supplied to the respective discharge sections 2a, 2b. Since such AC power sources for discharge excitation are themselves well known, a detailed description of for example their circuit layouts for adjustment of the supplied power is dispensed with.

In the same way as in the example shown in FIG. 8, the laser medium gas is circulated through a circulatory path passing through the optical resonator, by means of a fan 6. The medium gas that is delivered by the fan passes through a heat exchanger 5a for removing the heat of compression and is supplied to the discharge sections 2a, 2b. Laser light is emitted by excitation of the laser medium gas by discharge in the discharge sections 2a, 2b. The laser light that is generated is amplified in the laser resonator in accordance with well-known principles and the output laser beam is extracted from the output mirror 4b.

After emission of laser light, the medium gas that has been heated to a high temperature by the discharge is cooled in a heat exchanger 5b, before being returned again to the fan 6. The two discharge sections 2a, 2b in this example are constituted by two discharge tubes and, as described above, are driven by two power sources 1a, 1b for discharge excitation, that are independently operated.

Figure 2A:
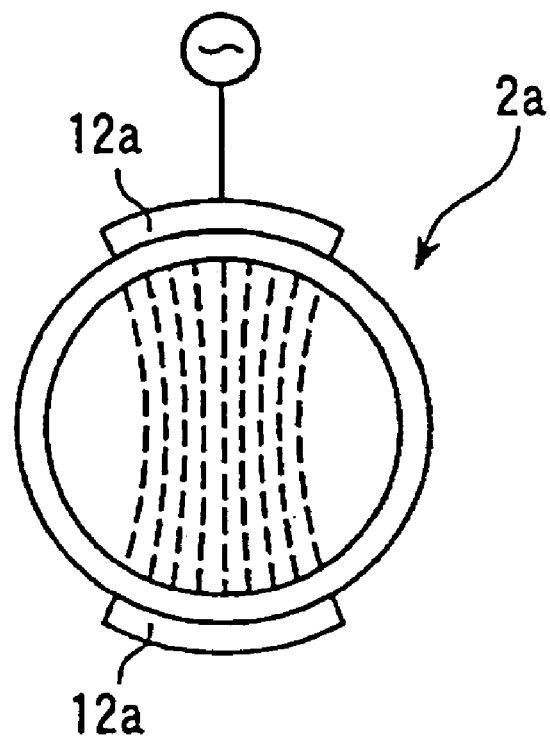
Figure 3A:
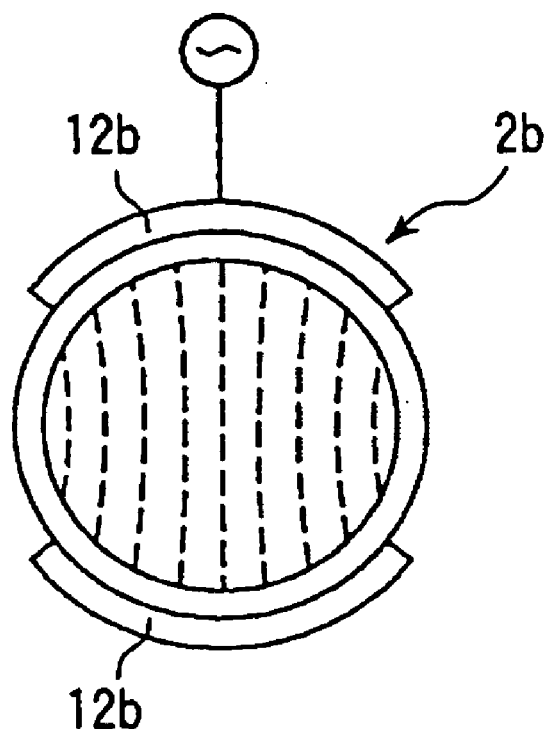
FIG. 3A is a cross-sectional view given in explanation of a discharge tube employed in a discharge section 2b and FIG. 3B is a view showing the mode that is excited when discharge is produced independently in the discharge section 2b.

What is important here is that, in contrast to the prior art example shown in FIG. 8, the shape of the electrodes of the discharge tubes constituting the discharge sections 2a, 2b is different. Specifically, in the discharge tube of the discharge section 2a, as shown in FIG. 2A, there is provided an electrode 12a having a narrow electrode width whereas in the discharge tube of the discharge section 2b, as shown in FIG. 3A, there is provided an electrode 12b having a broader electrode width.

As disclosed in Japanese Patent Application Laid-open No. 64-42187 mentioned above, the mode that is excited changes depending on the width of the electrode of the discharge tube. In this embodiment, when discharge is effected solely in the discharge section 2a, which is of narrow electrode width, (i.e. the power source 1b for discharge excitation is OFF), a mode similar to the gaussian mode as shown in FIG. 2B is obtained while, when discharge is effected solely in the discharge section 2b, which is of broader electrode width, (i.e. the power source 1a for discharge excitation is OFF), as shown in FIG. 3B, the ring mode is obtained.

Figure 2B:
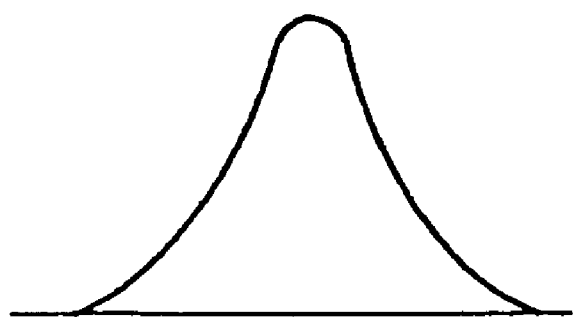
Figure 3B:
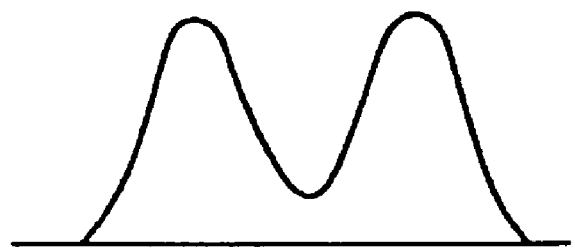
Figure 4:
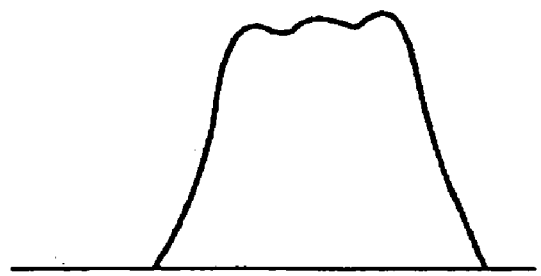
FIG. 4 is a view showing the mode that is excited when substantially the same power is supplied to the discharge sections 2a and 2b.

If discharge is produced in both of the discharge sections 2a, 2b, all of the modes that are intermediate between the mode close to gaussian mode shown in FIG. 2B and the ring mode shown in FIG. 3B can be obtained, depending on the distribution of the power supplied to the discharge sections. For example, if substantially the same power is supplied to the discharge sections 2a and 2b, a trapezoidal mode as shown in FIG. 4 is obtained.

Figure 5:
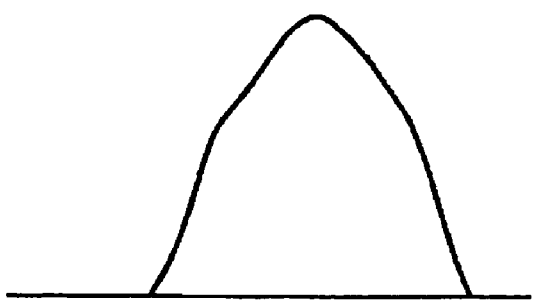
FIG. 5 is a view showing the mode that is excited when power supply to the discharge section 2a is made somewhat larger and power supply to the discharge section 2b is made somewhat smaller.
Figure 6:
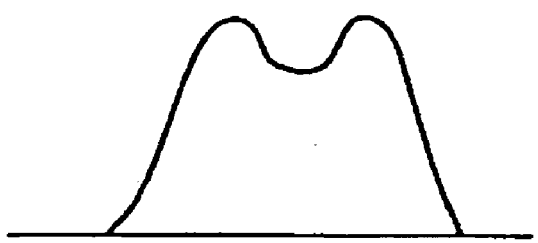
FIG. 6 is a view showing the mode that is excited when power supply to the discharge section 2a is made somewhat smaller and power supply to the discharge section 2b is made somewhat larger.

Also, if the power supply to the discharge section 2a is made larger while the power supply to the discharge section 2b is made smaller, a mode as shown in FIG. 5 is obtained while if the power supply to the discharge section 2b is made larger and the power supply to the discharge section 2a is made smaller, a mode as shown in FIG. 6 is obtained. In this way, a mode suited to the application can be set by adjusting the distribution of power supplied to the discharge sections 2a and 2b.

It should be noted that, although, in this embodiment, an example was described in which electrodes 12a, 12b having different electrode widths were employed in the two discharge sections 2a and 2b, the present invention is not restricted to this. In general, when two discharge sections are provided, so long as the combination of dimensions or shape of the two discharge sections themselves or the combination of dimensions, shape or construction of the electrodes is such that "when discharge is produced independently in the discharge sections having the respective electrodes, mutually different modes are excited", in the same way as in the embodiment described above, various different modes will be obtained by altering the distribution of power supplied to the two discharge sections.

That is, if the mode that is obtained when discharge is performed independently in the discharge section 2a is designated as mode A and the mode that is obtained when discharge is performed independently in the discharge section 2b is designated as mode B, all the intermediate modes of mode A and mode B can be freely selected.

In order to satisfy the condition regarding the combination of specifications of the above discharge sections, namely, that "when discharge is produced independently in the discharge sections having the respective electrodes, mutually different modes are excited", in general, it suffices if at least one of the "electrode shape", "electrode size (area)", "electrode structure", "shape of the discharge section itself" or "size (for example, diameter) of the discharge section itself" is made different.

Figure 7A:
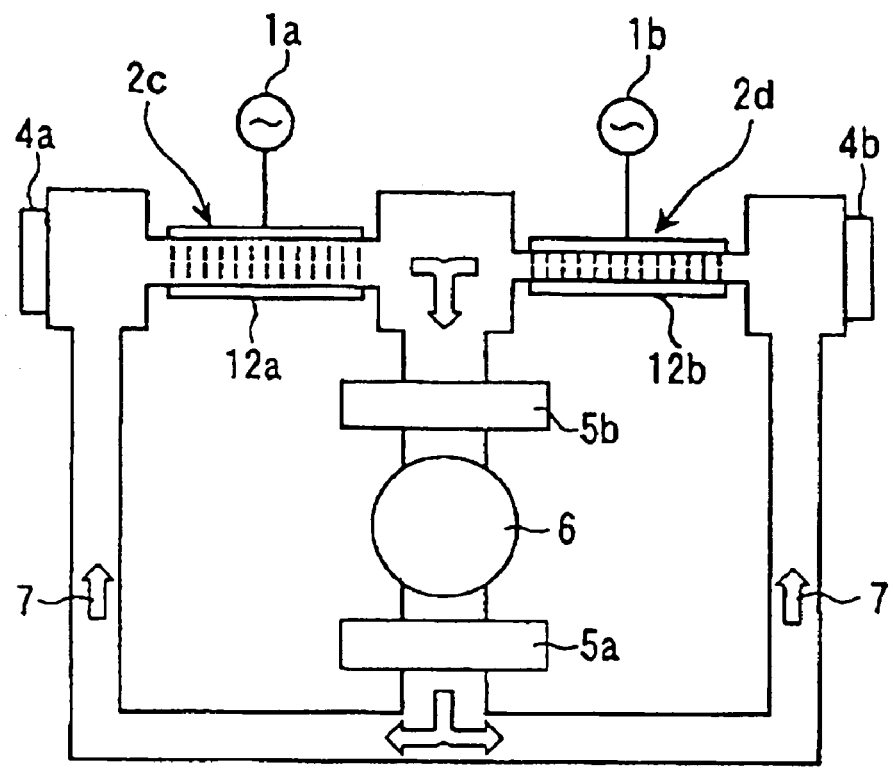
FIG. 7A is a view showing the layout of major parts of a laser oscillation device according to one embodiment of the present invention.

FIG. 7A is a view with the same mode of representation as in FIG. 1 of an embodiment in which two discharge sections having mutually different diameters are combined. The laser oscillation device shown in FIG. 7A has the same construction as that shown in FIG. 1 apart from the use of discharge sections 2c, 2d of mutually different diameter instead of the two discharge sections 2a, 2b (FIG. 1) (repetition of the detailed description is dispensed with).

Figure 7B:
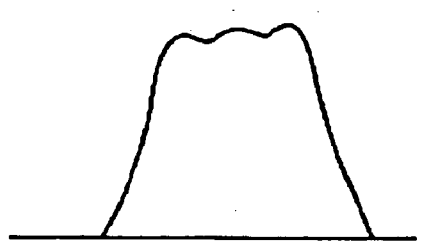
FIG. 7B is a view showing the mode obtained when substantially equal power supply is effected to discharge sections 2c and 2d.
Figure 7C:
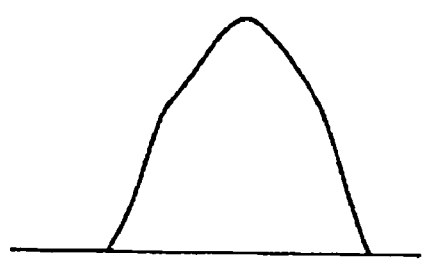
FIG. 7C is a view showing the mode that is obtained when power supply is effected solely to the discharge section 2d.
Figure 7D:
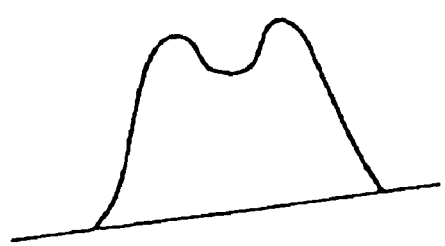
FIG. 7D is a view showing the mode that is obtained when power supply is effected solely to the discharge section 2c, respectively.

In this case, if substantially the same power is supplied to the discharge sections 2c, 2d, a substantially trapezoidal mode (FIG. 7B) is obtained. Also, FIG. 7C shows a mode of gaussian shape that is obtained if power is supplied only to the discharge section 2d and FIG. 7D shows a mode of double-peak shape obtained if power is supplied only to the discharge section 2c. Above from this, various modes obtained by mixing FIG. 7C and FIG. 7D can be obtained by various choices of the ratio of power supply by the variable power sources 1a, 1b for discharge excitation. A mode suited to a particular application can therefore easily be set.

Also, as another example in which the discharge electrodes are made different from each other, helical electrodes may be employed for the two discharge sections, the pitch of the helices being different. Another effective method is to provide a slit in the middle of one of the electrode widths (example of different construction).

Furthermore, even if the number of discharge sections provided in the optical resonator is three or more, so long as it is possible to control distribution of the supply of discharge power to each discharge section in respect of at least two discharge sections of these discharge sections and the electrodes are selected such that "different modes are excited when discharge is effected independently", a gas laser oscillation device whose mode can be controlled can of course be obtained just as in the case of the embodiments described above.

For example, two "discharge sections (using identical electrodes) whereby mode A is obtained in the case of independent discharge" having identical electrodes may be provided, these discharge sections being driven with a single power source for discharge excitation, and, in addition, there may be provided a single "discharge section whereby mode B is obtained in the case of independent discharge" having a separate electrode, between these two discharge sections, this single discharge section being driven with a single separate power source for discharge excitation. Variable control of the mode that is obtained from the laser oscillation device as a whole can then be achieved by adjusting the amount of discharge power that is supplied from the independently operated power sources for discharge excitation.

It should be noted that the type of gas laser oscillation device to which the present invention is applicable includes low-speed axial flow type lasers, biaxial orthogonal type lasers, triaxial orthogonal type lasers, or TEA lasers and the like, apart from the high-speed axial flow type lasers of the embodiments described above. Also, regarding the type of discharge, the present invention can be applied to DC discharge, pulse discharge or SD discharge type lasers, apart from the AC discharge type lasers described above. It is clear that the same benefits can be obtained by applying the present invention to gas lasers of these types also.

As described above, according to the present invention, a beam mode control function can be realized that is convenient and straightforward and of excellent controllability, so that the optimum beam mode for various applications can be set in a simple fashion, making it possible to apply the present invention to a wide range of applications. Also, when applied to a laser processing device, beam mode control can be achieved at any desired position or time during processing, thereby providing a laser processing device of excellent functionality.

What is claimed is:

1. A gas laser oscillation device, comprising:
a plurality of discharge sections that are respectively provided with electrodes for discharge;
a plurality of power sources for discharge excitation that supply discharge power to the discharge sections and are respectively connected with the electrodes of the plurality of discharge sections;
means for changing output mode, including:
means for adjusting a distribution of an amount of discharge power supplied to the discharge sections, so far as the amount of discharge power supplied to any one of the discharge sections is not zero; and means for changing combinations of beam modes that are different from one another, beams being excited in at least two discharge sections;

wherein said plurality of discharge sections include at least two discharge sections in which mutually different beam modes are excited when respective independent discharges are produced, based on one of (a) and (b):

(a) the electrodes provided in each of the discharge sections differ from one another in regard to at least one of dimensions, shape and construction; and (b) the discharge sections differ from one another in regard to at least one of dimensions and shape.

* * * * *

UNITED STATES PATENT AND TRADEMARK OFFICE
CERTIFICATE OF CORRECTION

PATENT NO. : 7,173,954 B2
APPLICATION NO. : 10/730264
DATED : February 6, 2007
INVENTOR(S) : Akira Egawa et al.

It is certified that error appears in the above-identified patent and that said Letters Patent is hereby corrected as shown below:

Column 6, Line 62, after "sections;" insert --and--.

Column 6, Line 66, before "so far" insert --from the plurality of power sources that supply discharge power to at least two of the discharge sections,--.

Signed and Sealed this

Thirtieth Day of September, 2008

JON W. DUDAS
*Director of the United States Patent and Trademark Office*